United States Patent [19]

De Zen

[11] Patent Number: 5,729,944

[45] Date of Patent: Mar. 24, 1998

[54] THERMOPLASTIC STRUCTURAL COMPONENTS AND STRUCTURES FORMED THEREFROM

[75] Inventor: Vittorio De Zen, Ontario, Canada

[73] Assignee: Royal Building Systems (CDN) Limited, Woodbridge, Canada

[*] Notice: The term of this patent shall not extend beyond the expiration date of Pat. No. 5,706,620.

[21] Appl. No.: 553,415

[22] PCT Filed: May 25, 1994

[86] PCT No.: PCT/CA94/00274

§ 371 Date: Nov. 22, 1995

§ 102(e) Date: Nov. 22, 1995

[87] PCT Pub. No.: WO94/28262

PCT Pub. Date: Dec. 8, 1994

[30] Foreign Application Priority Data

May 28, 1993 [CA] Canada ............................ 2097226

[51] Int. Cl.⁶ .................................. E04B 2/86; B28B 1/48
[52] U.S. Cl. ....................... 52/439; 52/309.17; 52/737.6; 264/154; 264/209.1
[58] Field of Search .................................. 52/220.2, 433, 52/439, 733.2, 736.1, 737.6, 284, 282.1, 282.2, 309.15, 309.17; 264/239, 176.1, 154, 209.1

[56] References Cited

U.S. PATENT DOCUMENTS

| | | |
|---|---|---|
| 1,958,124 | 5/1934 | Bemis . |
| 1,960,961 | 5/1934 | Thomas .................................. 52/733.2 |
| 3,284,971 | 11/1966 | Allwood .................................. 52/737.6 |
| 3,662,507 | 5/1972 | Espeland . |
| 3,950,902 | 4/1976 | Stout ...................................... 52/264 |
| 3,992,839 | 11/1976 | LaBorde . |
| 4,536,360 | 8/1985 | Rahrig . |
| 4,557,091 | 12/1985 | Auer . |
| 5,216,863 | 6/1993 | Nessa et al. . |
| 5,311,718 | 5/1994 | Trousilek .............................. 52/439 |

FOREIGN PATENT DOCUMENTS

| | | |
|---|---|---|
| 0320745 | 6/1989 | European Pat. Off. . |
| 200769 | 5/1968 | France . |
| 2193465 | 2/1988 | United Kingdom . |

*Primary Examiner*—Michael Safavi

[57] ABSTRACT

Thermoplastic structural components utilized within building construction as permanent formwork. The components formed with openings along a length which serve to allow concrete to flow from one form to adjacent forms. Thus, filling the components forming a surrounding wall of a building. The openings allow for air circulation within components forming a roof assembly. The components are co-extruded with a protective skin along outer surfaces thereof. Grooves are provided along the length of the component for mating with interlocking flanges of a box connector. Planar spaced walls are provided within each component and have a series of openings along a length thereof.

16 Claims, 10 Drawing Sheets

THERMOPLASTIC STRUCTURAL COMPONENTS AND STRUCTURES FORMED THEREFROM

FIELD OF THE INVENTION

This invention relates to reduction of the costs of the novel thermoplastic structural system and structural components therefor and building structures erected therefrom which are disclosed in my copending Canadian Application Ser. No. 2,070,079, filed May 29th, 1992 without adversely affecting their integrity.

BACKGROUND OF THE INVENTION

The structural system disclosed in my said copending application comprises novel interlocking thermoplastic structural components which can be mass produced at low cost and which can be quickly and easily interlocked together to erect a wide range of structures which will require minimal maintenance and will be safe from termites, corrosion, rust or rot and will be highly resistant to the effects of weathering.

The present invention is directed to significantly reducing the costs of such components and hence the costs of structures erected therewith without sacrificing the structural integrity of the components or system.

Further the invention is directed to such cost reductions of the components themselves and the structures formed therefrom without increasing the costs of production of the components or interfering with the ease of their assembly.

Further the invention is directed to providing such structural components as to aforesaid which will facilitate the conversion of the walls erected therewith into permanent wall structures, will enhance the air circulation in roofs erected therewith, and will provide reduced thermal transfer between the exterior and interwall surfaces of the walls and roofs.

DESCRIPTION OF PRIOR ART

While the use of plastic to form wall panels or the like for use in building construction has been proposed, such panels have not had the necessary load bearing or other structural requirements to form practical structures which could be mass produced at low cost and quickly and easily assembled to erect durable low cost structures and, in particular, low cost housing.

U.S. Pat. No. 3,992,839, for instance, discloses a plastic panel fabricated from separate panel members, preferably formed of polyvinyl chloride which snap together to form a thin wall panel. The panels in turn are formed to snap together to provide a wall structure. Such fabricated panels are inherently weak and lack the strength and load bearing capacity to form adequate structural components for use, for instance, in the forming of the walls and roof of a practical durable building.

U.S. Pat. No. 3,362,507 discloses the use of tongue and grooved individually prefabricated panels said to be preferably of plastic which are bonded or glued together and used particularly for the forming of basement walls. Such panels do not permit of high speed production and are not capable of being quickly and easily interlocked together in the erection of a house or other structure.

U.S. Pat. No. 4,457,091 discloses a hollow panel member having a width of about one and one-half inches (1½") and a complicated interior formed by pultrusion, a process involving drawing long glass strands and a plastic binding material forcefully through a die under heat to form the glass strands into a compacted glass mat bound together by the plastic material. Such a process is prohibitively slow and expensive and the panels themselves do not provide acceptable or practical low cost structures for forming the walls and roofing of a housing system such as contemplated by the present invention.

While modular building structures using modular building components formed of steel have also been proposed, such as disclosed in U.S. Pat. No. 1,958,124, such systems involve welding together of the members to make up the components and the use of bolts or other fasteners to secure same together.. Such systems are not practical for low cost practical housing and the like with which the present invention is concerned.

SUMMARY OF THE INVENTION

In accordance with the present invention, the structural building components comprise elongated thermoplastic extrusions presenting spaced interconnecting means, preferably spaced inwardly extending interlocking means extending the length thereof for sliding interlocking engagement with mating interlocking means of an adjoining mating structural member, said extrusions having at least one longitudinal web supporting the interlocking means in spaced relation with the web having a plurality of openings cut therethrough inwardly of the interlocking means and spaced along the length of the web.

According to the preferred form of the invention the openings are circular and preferably of a uniform diameter and more preferably still the openings have a diameter equal to a major portion of but less than the spacing between the interlocking means.

Preferably the structural components of the present invention are extruded from a vinyl chloride, preferably a polyvinyl chloride, containing a reinforcing and expansion controlling agent which preferably is selected from one or more of mineral fibres, small glass fibers and calcium carbonate.

More particularly, the extruded structural components comprise a core of polyvinyl chloride Containing a reinforcing and expansion controlling agent as aforesaid and a coextruded thermoplastic skin covering surfaces that will be exposed on assembly into a building structure.

Further, in accordance with the invention, the openings in the at least one web of the structural component are bored out of the web immediately after the component has been extruded and while it is still feeding away from the extruder.

Also, according to the invention, the material removed from the web is returned for reuse as a core extrusion material.

BRIEF DESCRIPTION OF THE DRAWINGS

These and other features of the invention will be understood from the following detailed description taken in conjunction with the accompanying drawings in which.

DETAILED DESCRIPTION OF THE PREFERRED EMBODIMENTS

Figure 3:
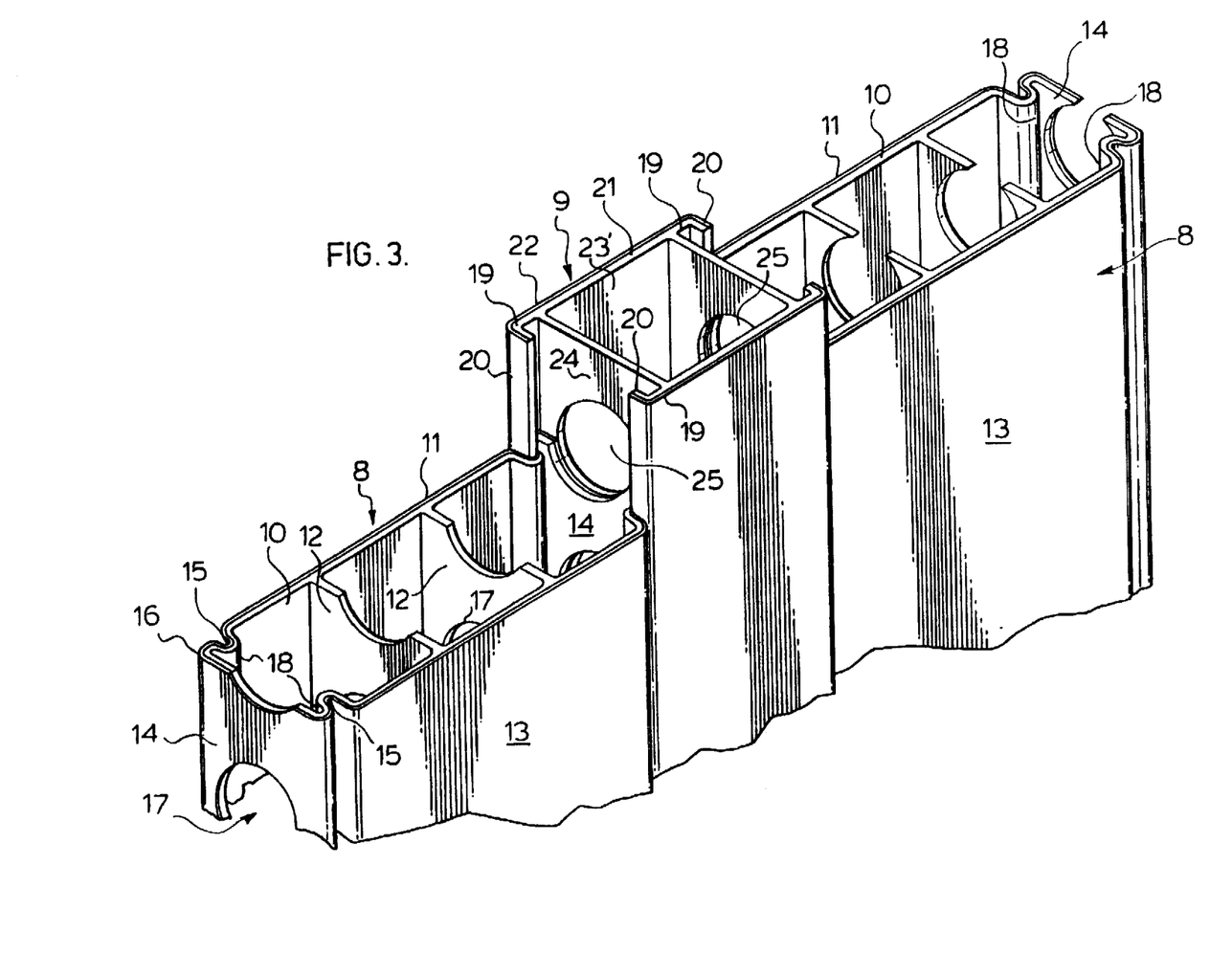
FIG. 3 is a perspective view illustrating a wall section showing a pair of wall panels interlockingly engaged with a connecting box connector and showing the components as comprising a core having the exposed external surfaces thereof coated with a smooth thermoplastic skin with the thickness of the skin being somewhat exaggerated for purposes of illustration.
Figure 12:
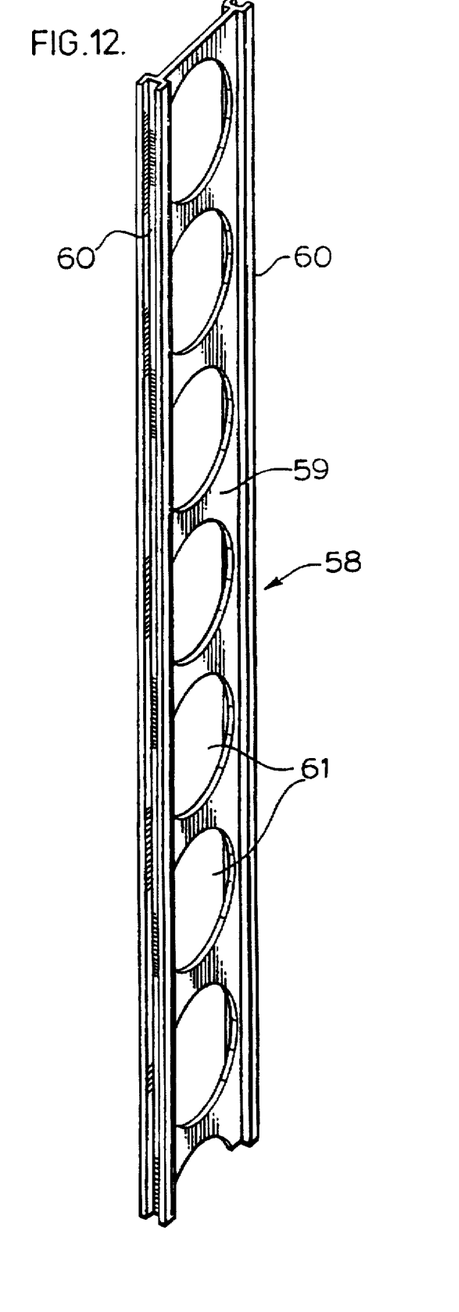
FIG. 12 is a perspective view of a box connector joiner embodying the invention.

It will be understood that while only FIG. 3 illustrates the coextruded skin on the exposed surfaces of the wall panels and the box connector, all of the panels and box connectors will have such an extruded skin and it is only components such as the box connector joiner of FIG. 12 which will have no exposed surfaces when assembled into a building structure that will be extruded without any skin coating.

Figure 1:
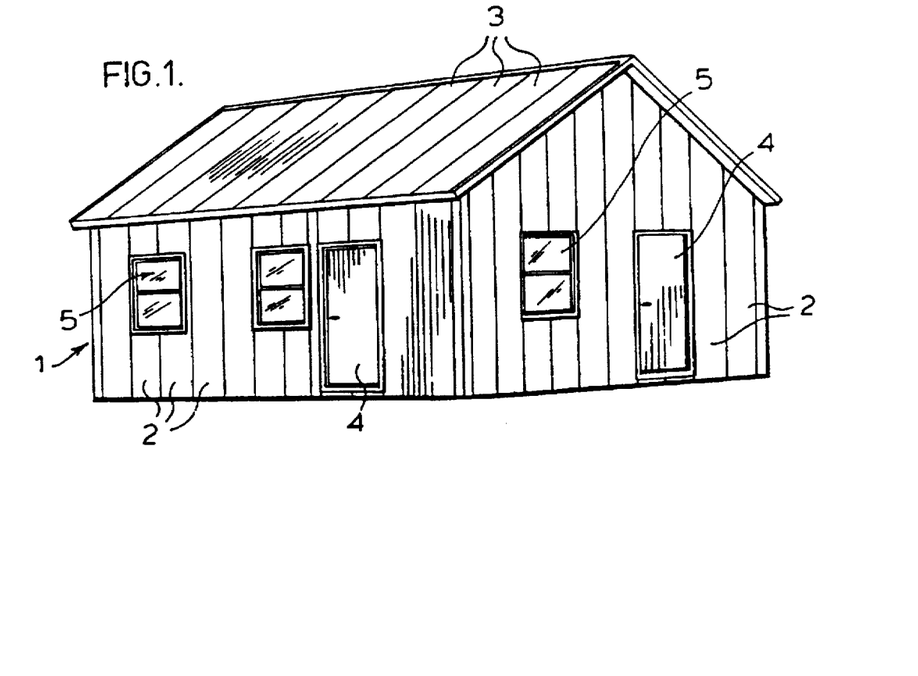
FIG. 1 is a perspective view of a small house erected from interlocking thermoplastic structural components such as form the subject matter of the present invention.

With reference to the drawings, FIG. 1 is a perspective view of a house 1 as an example of the type of building that can be erected with the thermoplastic interlocking building components of the present invention which can be assembled into walls 2 and roofing 3 with provision for doors 4 and windows 5.

Figure 2:
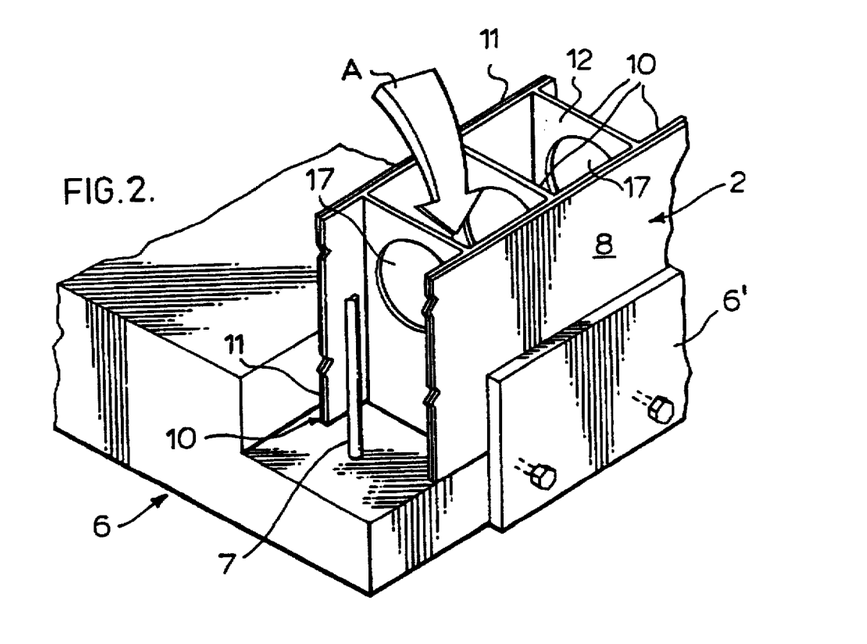
FIG. 2 is a broken away perspective view illustrating a wall panel embodying the present invention seated on a concrete base ready to receive concrete or other anchoring material to be anchored to the base through suitable anchor rods.

A building such as illustrated in FIG. 1 is intended to be erected on a concrete pad 6 as illustrated in FIG. 2 which shows how the walls 2 of the building can be anchored to the concrete pad 6 by means of anchor rods 7 when the interior of the walls 2 are filled with concrete and the like as illustrated by the arrow A. Suitable means such as the strip 6' may be employed to contain the concrete from spilling out from underneath the wall 2.

As more particularly illustrated in FIG. 3, the walls 2 are formed from wall panels 8 interlockingly interconnected by box connectors 9, one of which is illustrated in FIG. 3.

Each of the wall panels 8 in accordance with the invention disclosed in copending Canadian Application Ser. No. 2,070,079 comprises a hollow rectilinear thermoplastic extrusion having a core 10 and coextruded outer skin 11.

The core 10 preferably comprises a vinyl chloride and, more particularly, a polyvinyl chloride containing a suitable reinforcing and expansion controlling agent such as mineral or other fibers or other known expansion controlling agents such as a calcium carbonate.

A reinforcing agent or constituent particularly useful for structural components of the present invention which are subject to high loading comprises small glass fibers which when anchored in a thermoplastic material such as vinyl chloride or polyvinyl chloride provide the requisite reinforcing and expansion controlling characteristics to provide high structural strength.

A suitable material incorporating small glass fibers which can be used in the production of these panels 8 is available under the trade-mark FIBERLOC from the B. F. Goodrich Company of Akron, Ohio, such material being described in detail in B.F. Goodrich's U.S. Pat. No. 4,536,360 wherein very fine short glass fibers are bound within a composition of vinyl chloride resin.

The presence of glass fibers in the PVC or other thermoplastic material while providing tensile strength and expansion control to the material creates an extrusion problem and, if they are too large and too concentrated, it is not practical to extrude the material. Preferably, such fibers should be of the order of a few microns in diameter and a few millimeters in length and in concentrations not greater than and preferably substantially less than about 35% by weight based upon the combined glass fibers and vinyl chloride resins.

The presence of the glass fibers creates a brittleness which makes a structure produced solely from a glass fiber reinforced plastic subject to potential fracture from impact. This potential increases with increased concentration of glass fibers.

The problems encountered with the use of the glass fibers as the reinforcing constituent while utilizing their beneficial reinforcing qualities for high loading capacity have been resolved by coextending with the glass reinforced thermoplastic a smooth thermoplastic skin covering the external exposed surfaces of the panels.

The smooth plastic skin may be PVC, rigid PVC, semi-rigid PVC, ABS, polycarbonate with thermoplastics available from G.E. under the trade-mark GELOY and NORYL.

This skin 11 serves a number of useful purposes. Because of the presence of the glass fibers in the core or substrate 10, the substrate is somewhat brittle and its surfaces are rough and abrasive with portions of the glass fibers projecting through the surface of the substrate rendering the substrate somewhat porous and susceptible to the ingress of moisture which can adversely affect the bond between the glass fibers and the thermoplastic material.

The coextension of the thermoplastic skin covers and seals the outer exposed surfaces of the structural component against the ingress of moisture, thereby maintaining the integrity of the binding of the glass fibers to substrate plastic. Further, the outer skin 11 not only covers exposed glass fibers but these exposed glass fibers become embedded in the thermoplastic material so that the external surface of the component is totally smooth. The glass fibers in turn in becoming embedded in the outer skin lock the skin to the substrate or core 10 so that the expansion and contraction of the outer skin is fixed to the expansion and contraction of the core which is controlled or limited by the presence of the incorporated glass fibers which have a much smaller co-efficient of expansion than the plastic.

It will be also understood that the skin 11 can be formulated to include agents providing impact resistance, resistance to ultraviolet radiation and the like.

The combination of the co-extruded core or substrate 10 and smooth skin 11 thus enable the provision of wall panels having inherent structural strength and which are essentially maintenance free, impact resistant and they will be free from corrosion, rot or rusting and will be impervious to moisture, termites and other insects.

While the use of the glass fibers provides the strength necessary for handling high loading, where the panels will be subjected to much lighter loading the core 10 may be formed of a vinyl chloride containing from about 5% to about 50% calcium carbonate and preferably about 5% to 30% calcium carbonate by weight.

Alternatively, a mixture of calcium chloride and glass fibers or other reinforcing agents such as mineral fibers may be used to meet the particular load specifications required for the panel.

As illustrated in FIG. 3, each of the panels 8 is provided with two transverse webs 12 which tie the opposing faces 13 of the panel together intermediate the edge walls 14 of the panel.

Adjacent each of the edge walls 14, the panel 8 is provided with inwardly extending oppositely registering grooves 15 with the width of the panel being reduced outwardly of the grooves 15 to the edge walls 14 to, in effect, provide a tongue portion 16.

As the cost factor is a critical element in the ability to provide affordable housing to the masses, it has been found that this cost factor can be significantly reduced in material costs by cutting a series of openings 17 out of the webs 12 and edge walls 14 at spaced points along their length.

This cut out material can then be collected and reused in the extrusion of the core of a subsequent extrusion.

The openings 17 are preferably circular openings having a diameter slightly less than the spacing between the most adjacent point 18 of the grooves 15.

With the openings 17 centered on the midpoint of the edge walls 14 and midway between the panel faces 13, the openings can be cut through the edge walls 14 and also through the webs 12 without interference with the grooves 15 which extend uninterrupted throughout the length of the extrusion.

Still with reference to FIG. 3, the panels 8 are shown interlocked with the box connector 9 in the form of a hollow extruded rectangle having projecting flanges 19 terminating in inturned oppositely registering locking fingers 20 adapted to slidingly interlock with the grooves 15 of the panels 8.

The box connector 9 is extruded with a core 21 and a coextruded outer skin 22 covering the outer surfaces of the walls 23, the flanges 19 and the locking fingers 20.

Because of the inherent strength of the configuration of the extruded rectangular box connector 9, its core 21 may comprise a PVC resin and, for example, calcium carbonate, as the expansion controlling and reinforcing agent, although other agents including small glass fibers and mixtures of agents may be used.

It will be noted that the outer surfaces of the walls 23 of the box connector 9 covered by the outer skin 22 are precisely aligned with the outer surfaces of the panel faces 13 with the tongue portions 16 of the panels being received in the space between the inturned locking fingers 20 and the transverse walls or webs 24 of the box connector.

Again, the box connector is provided with a series of openings 25 through the transverse walls or webs 24. Again, these openings are circular with a diameter centered on the midpoint of the transverse walls or webs 24 of the box connector and spaced along the length thereof with the diameters of the openings substantially equal to, but less than, the spacing between the inturned locking fingers 20 so that the locking fingers are not intersected during the cutting of the openings 25.

It will be seen that the panel locking grooves 15 are covered in the smooth coextruded skin 11 to provide a smooth surface for smooth sliding interlocking engagement with the smooth skin coated locking fingers 20. Further, the outside faces of the tongues 16 which form the edge walls 14 of the panels are coated with the smooth skin 11 and preferably these faces are slightly concaved to eliminate any interference with the box connector transverse webs or walls 24.

Again, the material cut out from the box connector walls or webs 24 can be collected and returned to be used as material for extruding subsequent box connectors.

It has been found, for example, that with a wall panel width of 100 millimeters between the faces 13, circular holes having a diameter of 70 milliments and spaced 12.7 millimeters apart provide a significant saving in material and cost of the vinyl extrusion product without significantly affecting the structural strength of the panel so that when concrete is poured therein such as illustrated in FIG. 2 to convert the wall panel into a permanent wall configuration the webs and edge walls of the panels which are placed under tension exhibit adequate tensile strength tieing the panel faces 13 against outward bulging under the concrete load.

In addition to the savings in material costs, the provisions of the openings 17 and 25 limits thermal transfer between the outer or exposed faces 13 of the panels 8 and the outer exposed walls 23 of the box connector 9. As a result the components provide increased insulation between the exterior and interior wall of a building such as shown in FIG. 1.

Figures 4, 5:
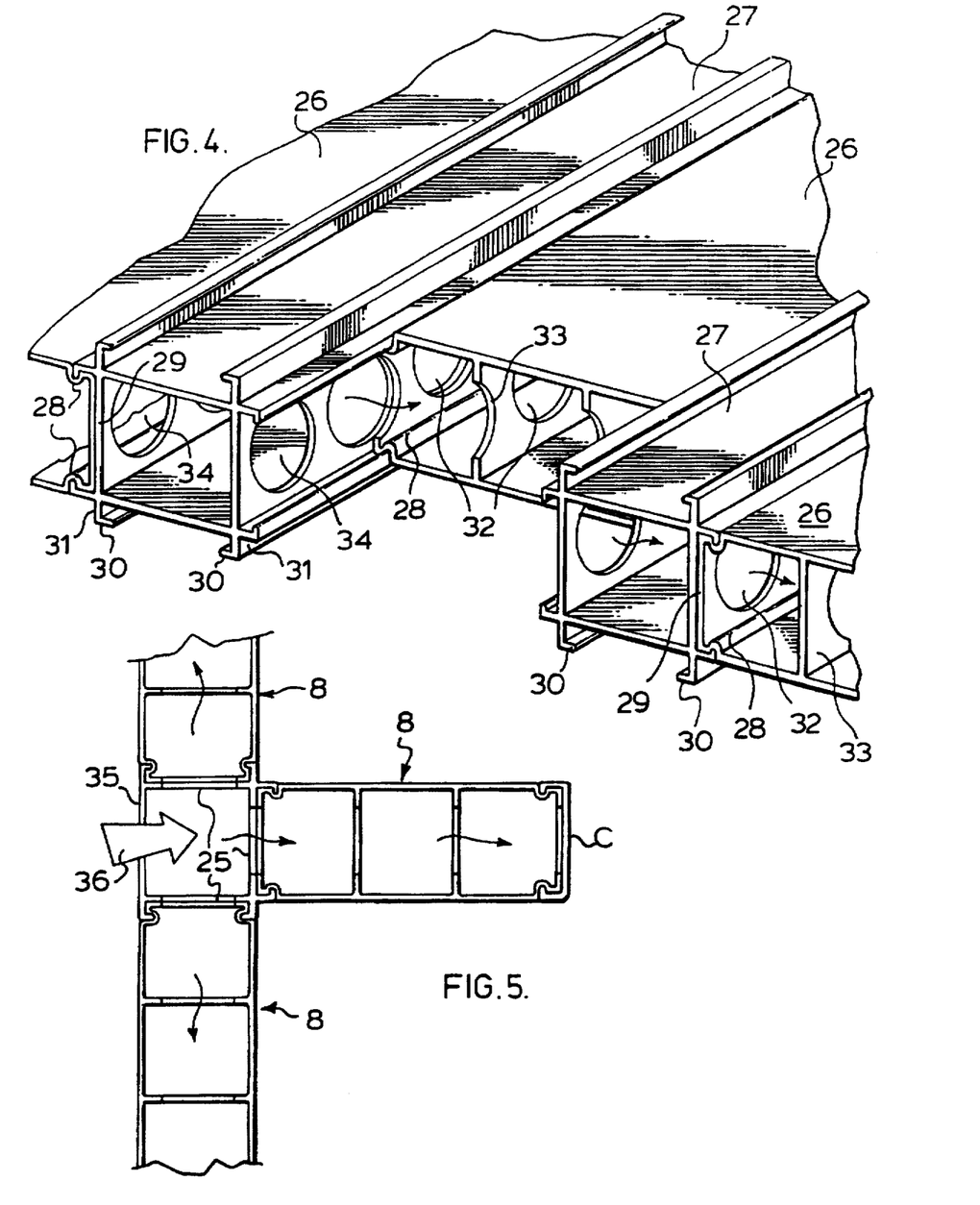
FIG. 4 is a perspective view illustrating a plurality of roof panels corresponding to the wall panels of FIG. 3 embodying the invention connected by four-way box connectors according to the invention, the four-way box connectors being available for the attachment of cladding to the upper surface of the roof and for engagement with other components beneath the roofs surface.
FIG. 5 is a plan view showing a three-way box connector interlockingly connecting two aligned wall panels and a third wall panel at right angles thereto.

FIG. 4 illustrates an arrangement of roofing panels 26 which are shown interlocked together by four-way box connectors 27 rather than a two-way box connector 9 as illustrated in FIG. 3 and which would be used to provide the smooth roof formation shown in FIG. 1.

The four-way box connectors 27 provide for interlocking roof cladding to the upper surface of the roof and for engaging or supporting other structures beneath the roof.

The roof panels 26 are similar to the wall panels 8 and it will be understood that they are extruded to provide a core and a coextruded outer skin covering the outer surfaces thereof (the separate layers not being shown).

Again, depending upon the anticipated loading of the roof structure, the reinforcing agent or agents selected for the core of the roof panels 26 will be appropriately selected.

For high loads the reinforcing agent preferably would include at least some of the fine small diameter short glass fibers.

Again, as in the case of the wall panels 8, the roof panels 26 are formed at opposite longitudinal edges with oppositely registering inwardly extending locking grooves 28 and edge tongues 29 for sliding interlocking engagement with the inturned locking fingers 30 carded by the flange extensions 31 of the box connectors 27. Similar inturned locking fingers 30 are provided on the box connectors 27 to project above and below the interlocked roof panels.

The roof panels 26 have circular holes 32 cut through their edge tongues 29 and webs 33 corresponding to the circular holes or openings 17 cut out from the wall panels 8. Similarly, the four-way box connectors 27 have circular openings 34 cut therefrom corresponding to the openings 25 in the two-way box connector.

In a roofing structure formed from the thermoplastic components, it is highly desirable that air circulation be effected within the roof structure. In this respect, the cutting out of the holes 32 and 34 provides free air circulation laterally of the roof in addition to the air circulation with can be effected lengthwise of the elongated hollow extruded roof components.

Additionally, it will be appreciated that the provision of the openings in the roof panels and their connecting box connectors restrict thermal transfer from the upper roof surface to the underside of the roof thereby adding to the thermal insulation provided by the components. It will also be appreciated that, if desired, the roof panels and connectors can be filled with suitable insulating material.

Despite the removal of the material resulting from the cutting of the circular holes 32 from the roof panels the webs 33 provide the requisite resistance to roof panel bending to sustain high roof panel loading augmented by the interengaging panel tongues 29 and box connector flanges 31 and locking finger 30.

FIG. 5 is a plan view illustrating the connection of three wall panels 8 into a T-formation using a three-way box connector 35. The three-way box connector is provided with openings 25 in three of the walls thereof so that when material is introduced as indicated by the arrow 36 into the box connector 35, which material may be concrete, sand or insulation material, it can flow through the various openings into the wall panels. As illustrated, the leg of the T-formation is closed by an end cap C formed to interlock with the tongue 16 and grooves 15 of one of the panels 8 to contain all material within the external walls of the panel and box connector.

Similarly, should it be desirable to introduce insulation material into the interlocked roof panel as illustrated in FIG. 4, such material can be injected for distribution within the roof structure by virtue of the existence of the cut out holes. Since the spacing between the holes is much less than the diameter of the holes, there will always be significant registration between the holes or openings cut in the adjoining interlocking components.

Figure 6:
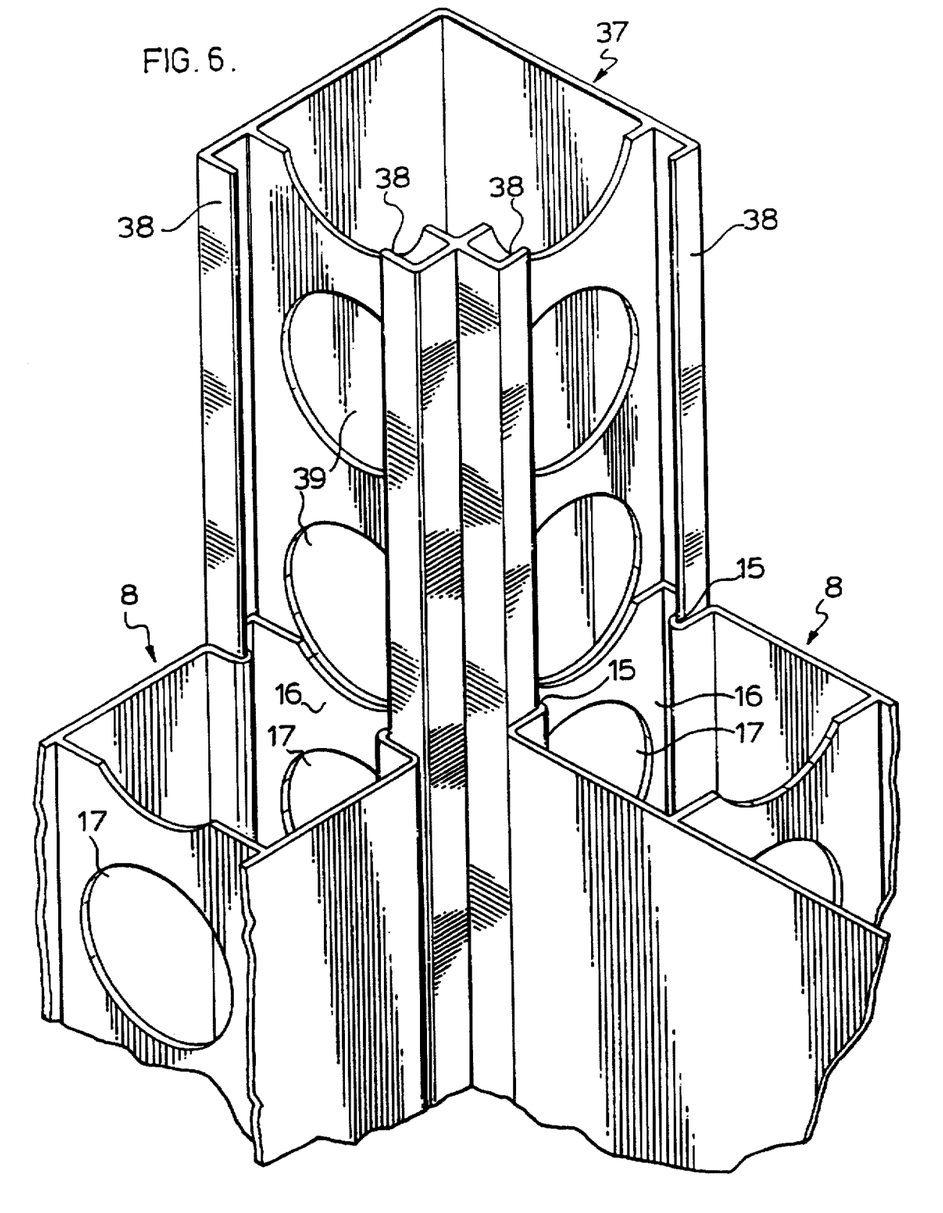
FIG. 6 is a perspective view illustrating a corner box connector connecting two wall panels in right angular relation.

FIG. 6 illustrates a corner box connector 37 connecting two wall panels 8 together in right angular relation. Box connector 37, as before, is extruded with an appropriate core and a co-extruded outer skin and is provided with the requisite inturned locking fingers 38 on adjacent sides and with the cut out circular openings 39 centered between these inturned locking fingers and having diameters less than the spacing between the locking fingers.

Figure 7:
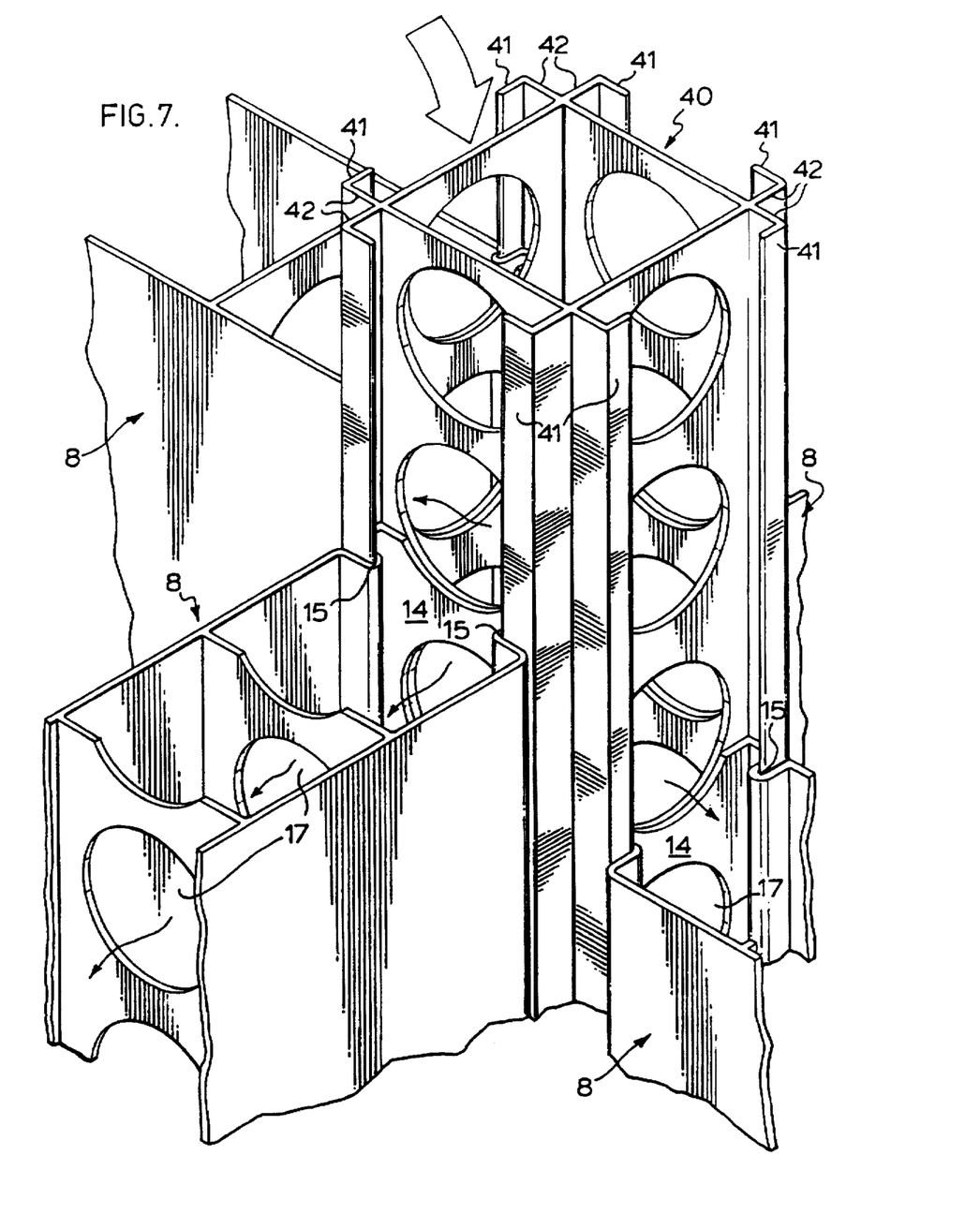
FIG. 7 is a perspective view illustrating a four-way box connector for connecting four wall panels in right angular relation.

FIG. 7 shows a four-way locking connector 40 for interlockingly connecting four wall panels 8 in right angular relation. In this case, the connector 40 has inturned locking fingers 41 at all four sides of the connector and circular openings cut out therefrom in all four walls of the connector.

It will be understood again that the connector 40 is formed of a reinforced core with the exposed surfaces, that is the locking fingers 41 and their supporting flanges 42 coated with a smooth skin:

It will be noted that the arrangement of the openings cut out from the various extruded components is such that the openings are internal of the exterior walls of the structure being assembled therefrom when they are slidingly interlocked with the appropriate mating components.

Figure 10:
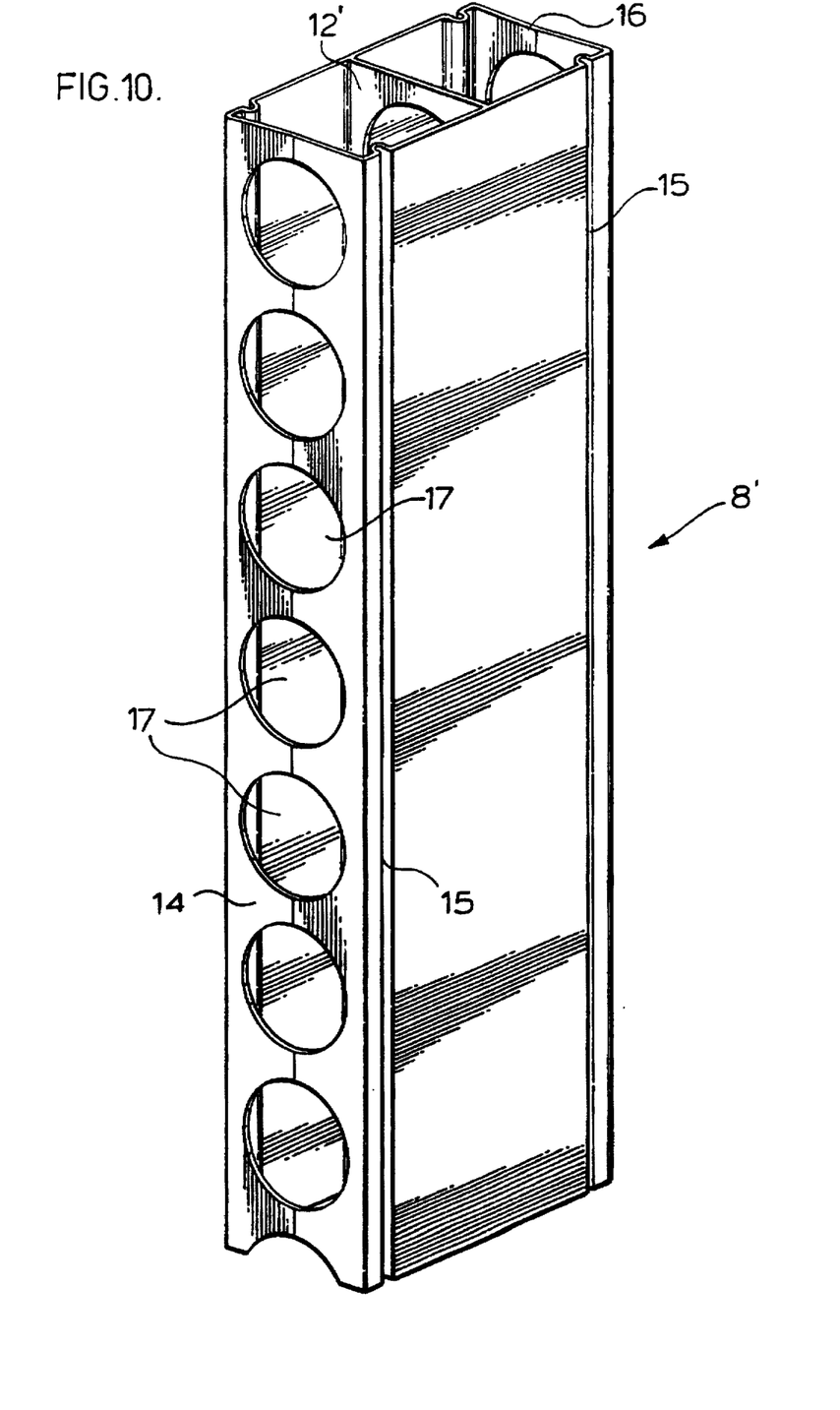
FIG. 10 is a perspective view of a wall panel according to the invention having a single interior web.

FIG. 10 is a perspective view illustrating a wall panel 8' corresponding to the panel 8 except that it has a shorter span with a single web 12'. Otherwise the panel is identical with panel 8 and like numbers refer to like parts.

Figure 11:
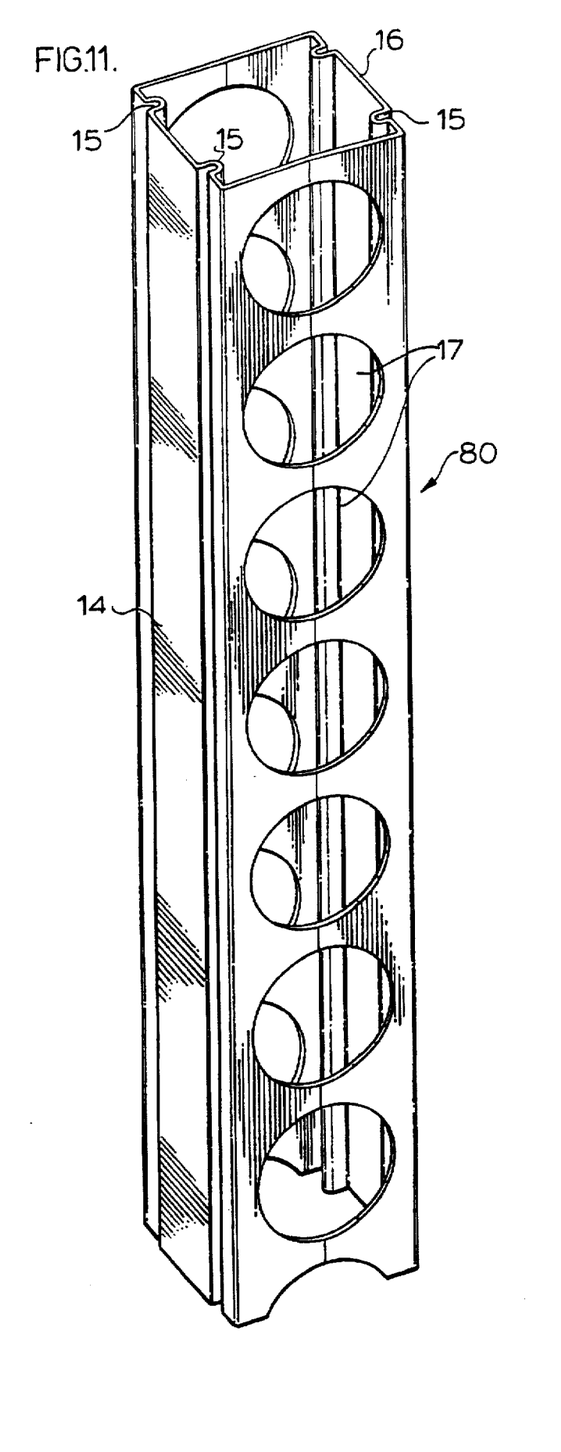
FIG. 11 is a perspective view of a wall panel with no interior web.

Similarly, FIG. 11 illustrates a still smaller wall panel 80 which may be used at a wall corner. Panel 80 has no internal webs but otherwise has the same interlocking features and the same cutout openings as wall panel 8 and like numbers represent like parts.

Figure 8:
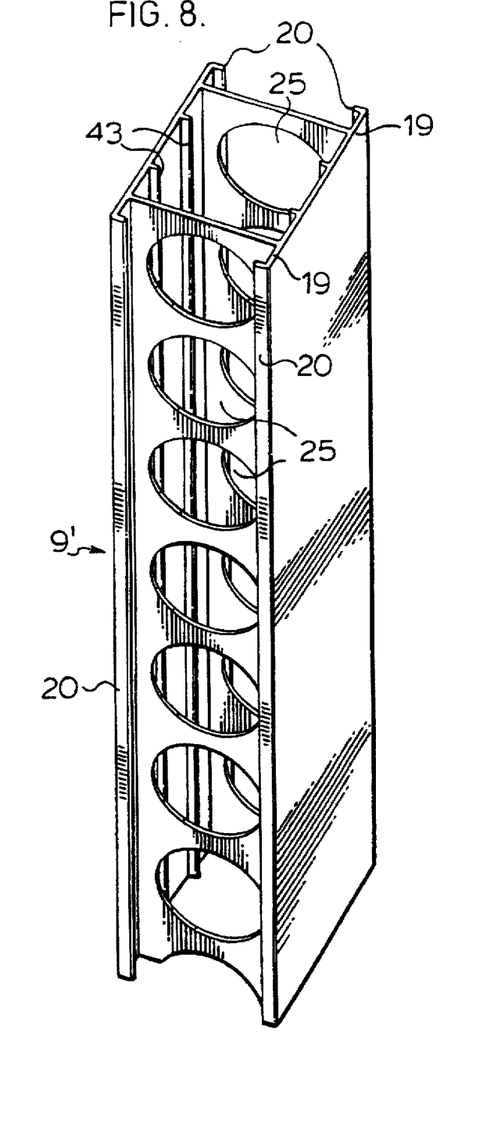
FIG. 8 is a perspective view of a slightly modified two-way box connector having interior locking fingers for interlocking engagement with a mating insert.

FIG. 8 illustrates a two-way box connector 9' corresponding to box connector 9 but additionally having internal key ways comprising out turned locking fingers 43 for sliding interlocking engagement with mating inserts (not shown).

Figure 9:
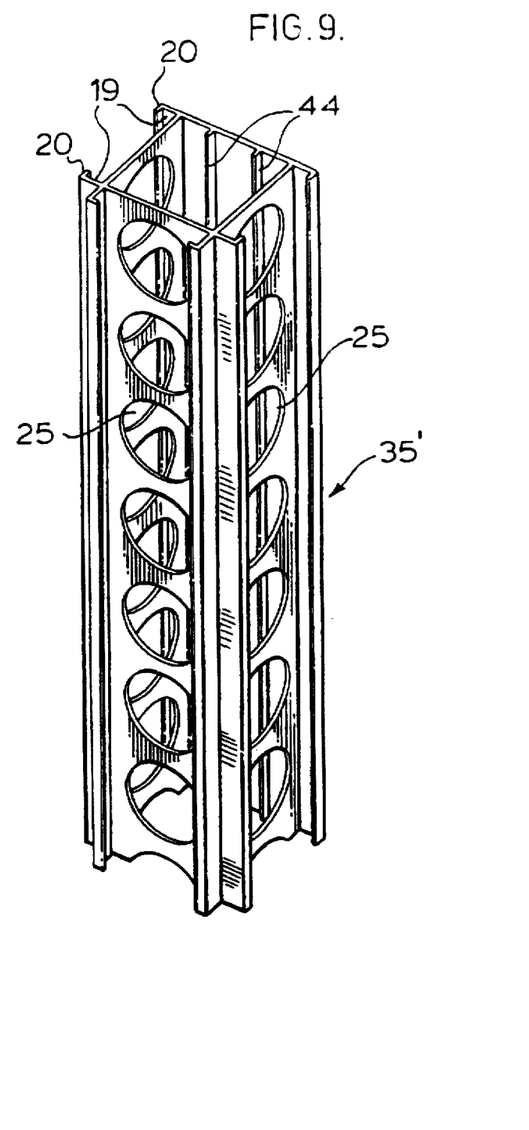
FIG. 9 is a view similar to FIG. 8 but showing a three-way box connector.

FIG. 9 is a perspective view of a three-way box connector 35' similar to box connector 35 but having an internal slideway comprised by out turned locking fingers 44 for supporting an internal insert (not shown).

Figure 13:
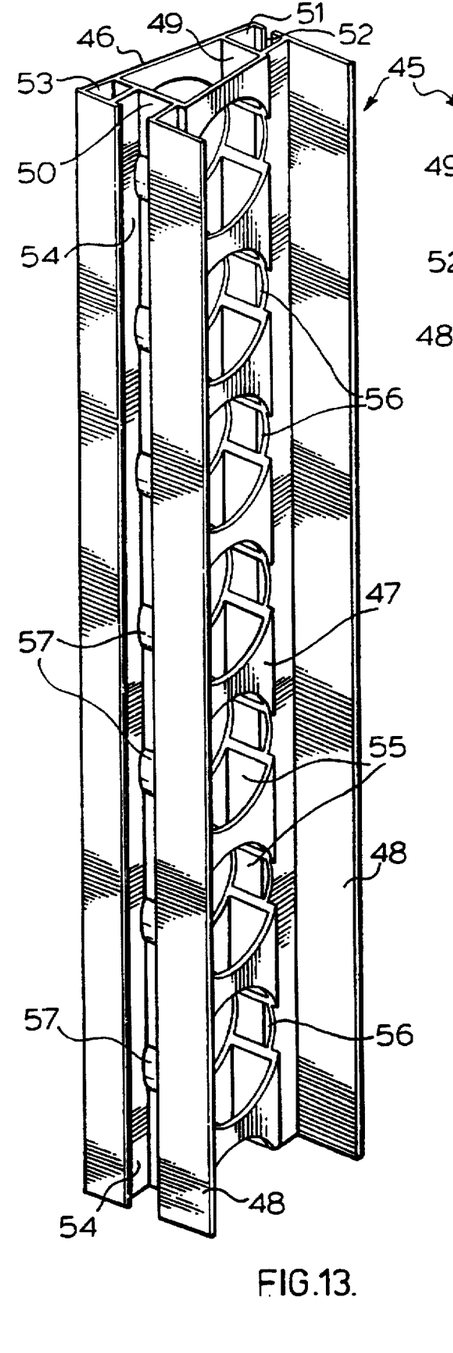
FIG. 13 is a perspective view taken from the underside of a sloping wall cap embodying the invention.
Figure 14:
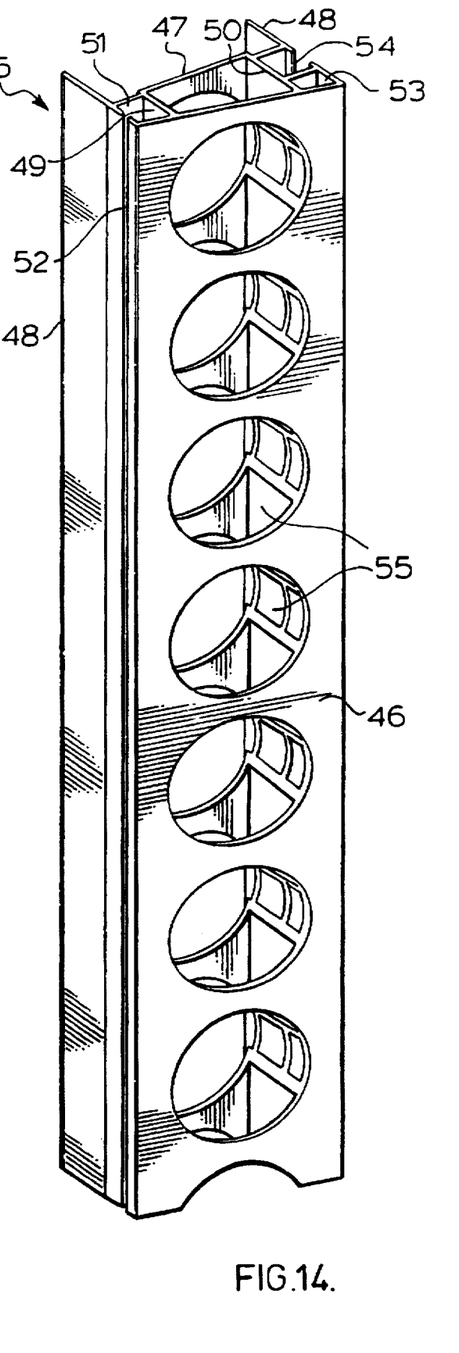
FIG. 14 is a perspective view of the wall cap of FIG. 13 taken from the top side.

FIGS. 13 and 14 illustrate a wall cap 45 adapted to fit down over the top of a wall formed from wall panels such as panels 8 and box connectors such as box connectors 9 to present a sloping support surface 46 for supporting a sloping roof such as illustrated at 3 in FIG. 1.

Wall cap 45 is a hollow extrusion having a bottom wall 47 adapted to rest on the upper ends of an erected wall and having down-turned flanges 48 forming interconnecting means adapted to embrace opposite faces 13 of the wall.

Webs 49 and 50 extending upwardly from the bottom wall 47 support the sloping upper surface 46 with the web 50 being of a greater height than the web 49.

The wall cap 45 is provided at the lower side of the sloping wall 46 with a chamber 51 which has an access slot 52 which may be closed by screening of the like (not shown). At the opposite side, the wall cap is provided with a closed chamber 53 and an open chamber 54.

In accordance with the invention, the bottom wall 47 and the sloping wall 46 are provided with circular openings 55 cut therethrough. For this particular component, the diameter of the openings, while less than the spacing between the flanges 48, is greater than the spacing between the webs 49 and 50 so that during the cutting of the openings 55 a portion of the webs 49 and 50 are removed to provide access openings 56 and 57 to the chambers 51 and 54.

Since the bottom wall 47 and the sloping upper wall 46 will not be exposed when the wall cap 45 is installed in place, these surfaces need not be coated with a covering skin. The other exposed surfaces, however, will have a skin coextruded over the core material to provide the desired smooth finish.

FIG. 12 is an extrusion for connecting box connectors together and, when in place, will be totally enclosed and will have no exposed surfaces that require coating.

As illustrated, this box connector connector 58 comprises a web 59 spacing two outwardly facing channels presenting two inwardly projecting grooves 60 of a width to receive the interlocking fingers such as the fingers 20 of two adjoining box connectors 9 when their locking fingers are in abutting relation. In this manner connector 58 will lock the box connector together while being totally contained within the abutting box connector flanges and abutting interlocking fingers..

The web 59 is provided with a plurality of circular openings 61 cut therefrom with the diameter of the openings being substantially equal to but slightly less than the spacing between the two channels 60. Connector 58 is preferably extruded from a polyvinyl chloride but since it is not subjected to significant loading the amount of reinforcing agent, if any, can be minimal. Again, because it is enclosed when in position, no exposed surfaces requiring a skin coating are presented.

Figures 15, 16:
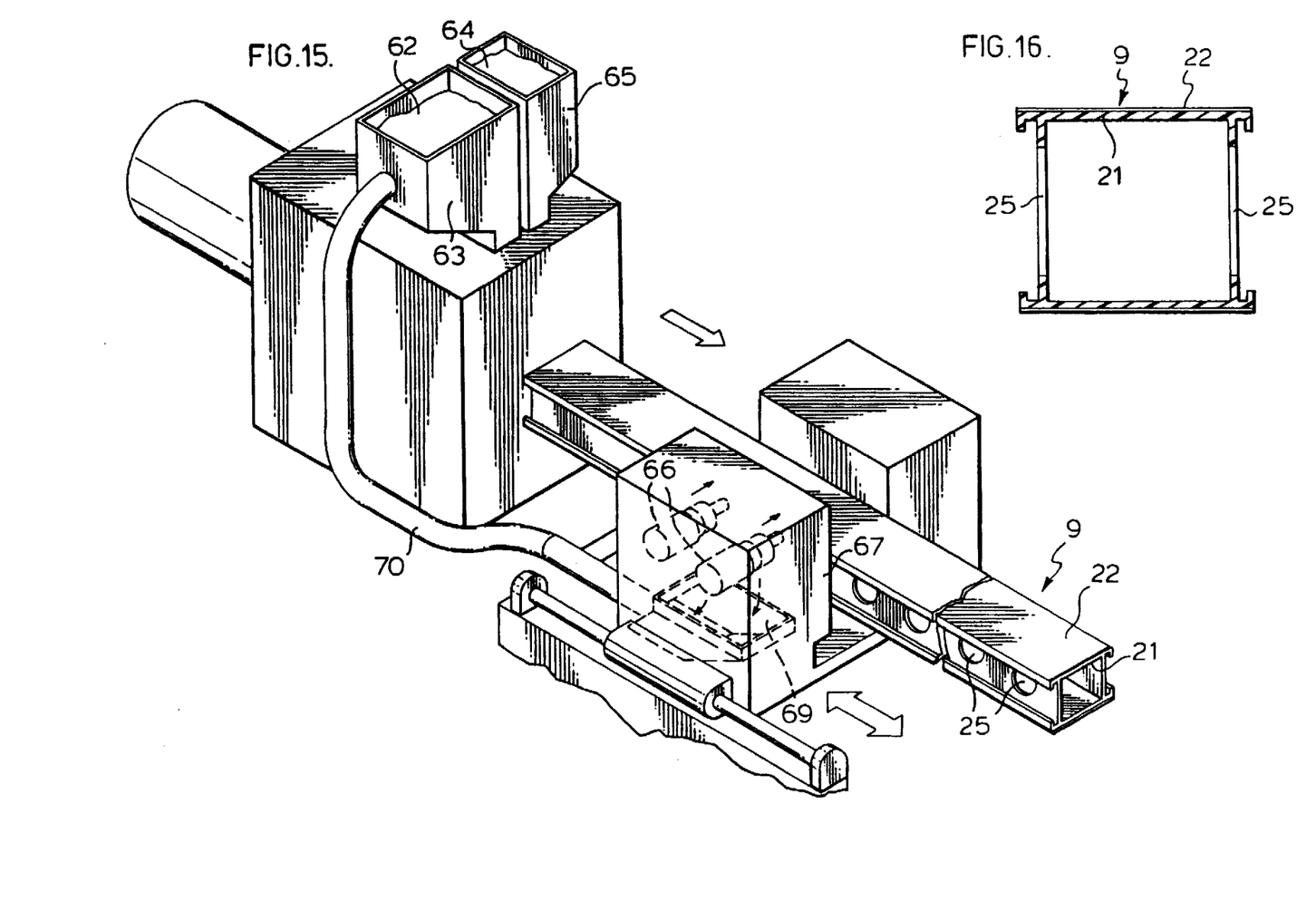
FIG. 15 is a diagrammatic view illustrating the manner in which the components of the present invention are extruded and then drilled to produce the openings through the webs thereof.
FIG. 16 is a cross-sectional view of the particular box connector shown being extruded in FIG. 15.

FIG. 15 is a diagrammatic illustration of the method of manufacturing the extruded components of the present invention and illustrating the extrusion of a straight box connector 9 having a core 21 and a coextruded outer skin 22 and provided with circular openings 25 cut therefrom.

As illustrated, thermoplastic material 62 formulated with the desired ingredients to form the core of the box connector 9 is fed from hopper 63 into a suitable extrusion die (not shown) from which it is delivered in a continuous stream having the requisite cross-sectional shape. At the same time, material 64 suitable for the coextruded skin is delivered from hopper 65 and coextruded to cover the exposed surfaces of the box connector.

As the coextruded core and skin are fed continuously out of the extrusion die arrangement suitable rotary drills 66 carded by a horizontally reciprocating carriage 67 mounted on guide 68 are utilized to drill the holes 25.

The movement of the carriage 67 is such that it moves away from the extrusion apparatus at the same speed as the box connector extrusion is delivered out of the extruder so that during the drilling the extrusion and the drills have no relative movement in the direction of extrusion feed. As soon as the holes are cut and the drills retracted, they are rapidly returned rearwardly of extrusion feed to the start position to then recommence a fresh cycle of drilling while moving at the same speed as the extrusion feed.

The drills are arranged so that when they retract they withdraw the material cut from the extrusion where it can be dropped unto a collector pan 69 and delivered back by a suitable feed 70 into the core material hopper 63.

Following extrusion and drilling, the box connector extrusion can be cut off at the requisite lengths depending on the nature of the building structure with which it is to be employed.

By using the structural components of the invention which have material cut or removed therefrom and recycled as described, savings in the cost of a building such as a house of up to 25% can be achieved further significantly increasing the affordability of housing and the like for the low income masses.

While a number of different structural components have been shown and described, it will be understood that the principles of the invention may be employed to produce various other structural component profiles to meet the requirements for producing the shape of the building structure desired. It will also be understood that variations may be made in the details of the component structures and the arrangement of the material cut out may be made without departing from the spirit of the invention or scope of the appended claims.

I claim:

1. An elongated hollow generally rectilinear thermoplastic structural component for use in the erection of a thermoplastic building structure, said component comprising a coextrusion of a hollow substrate of reinforced thermoplastic material having spaced substantially planar walls held in spaced relation by transverse walls or webs and having interlocking means extending the length of said planar walls and a smooth protective coextruded thermoplastic skin covering the outer surfaces of said planar substrate walls, said transverse walls or webs having material cut therefrom to provide a plurality of openings along the length thereof and inwardly of said interlocking means, the material cut from said walls or webs providing material suitable for use as substrate material in the coextrusion of a subsequent component.

2. An elongated thermoplastic building component as claimed in claim 11 in which said substrate material is a polyvinyl chloride containing a reinforcing and expansion controlling agent.

3. An elongated thermoplastic building component as claimed in claim 2 in which said substrate contains material cut out from the walls and webs of previously extruded components.

4. An elongated thermoplastic building component as claimed in claim 2 in which said reinforcing and expansion controlling agent in said substrate is selected from one or more of the group consisting of mineral fibers, glass fibers and calcium carbonate.

5. An elongated thermoplastic building component as claimed in claims 1, 2 or 3 in which said component comprises a longitudinal panel and said transverse webs include webs which extend across between said substantially planar walls and form the longitudinal edge walls of said panel and at least one web which defines internal compartments within said panel between said panel edge walls, and said interlocking means comprises inwardly projecting oppositely registering grooves in said substantially planar walls adjacent each of said panel edge walls and extending throughout the length of said substantially planar walls, the spacing between said substantially planar walls being reduced outwardly of said grooves to provide a locking tongue and said openings are provided in each of said webs.

6. An elongated thermoplastic building component as claimed in claims 1, 2 or 3 in which said component comprises a box connector in the form of an elongated hollow rectangle, two opposed walls of which are constituted by said substantially planar walls, and two walls of which are constituted by said transverse webs.

7. An elongated thermoplastic building component as claimed in claims 1, 2 or 3 in which said smooth skin is selected from one of the group consisting of PVC, rigid PVC, semi-rigid PVC, ABS, and polycarbonate.

8. An elongated thermoplastic building component as claimed in claim 7 in which said substrate comprises a polyvinyl chloride containing from about 5 to 50% calcium carbonate.

9. An elongated thermoplastic building component as claimed in claim 8 characterized in that said substrate contains from about 5 to 30% calcium carbonate by weight.

10. An elongated thermoplastic building component as claimed in claims 1, 2 or 3 in which said skin has a thickness at least of the order of about 0.015 inches and said substrate has a thickness of the order of at least about 4 to 5 times the thickness of said skin.

11. An elongated thermoplastic building component as claimed in claims 1, 2 or 3 in which the spacing between opposing walls of each said component is of the order of several tens of times the combined thickness of said substrate and skin.

12. An elongated thermoplastic building component as claimed in claim 1 in which the amount of material cut from said walls or webs is a substantial proportion of the total amount of material in said component prior to removal of the cut out material.

13. An elongated thermoplastic building component as claimed in claim 12 in which said substantial proportion is of the order of up to about 25% by weight.

14. A method of manufacturing hollow rectilinear thermoplastic building components adapted for interlocking engagement to form building structures, said method comprising co-extruding said components to provide spaced planar walls held in spaced relation by transverse webs and presenting interlocking formations for interlocking engagement with mating components, salad building components being formed of substrate material containing a reinforcing agent, while co-extruding a thin smooth thermoplastic skin to cover the outer surfaces of said planar walls, cutting material from said transverse walls and webs to provide openings therethrough, recovering said material cut from said transverse walls or webs, and reusing said recovered materials as substrate material in the coextrusion of a subsequent component.

15. A method as claimed in claim 14 in which said substrate material is a polyvinyl chloride containing a reinforcing and expansion controlling agent selected from one or more of the group consisting of calcium carbonate, mineral fibers, and small glass fibers.

16. A method as claimed in claim 14 or 15 which said smooth thermoplastic skin is selected from one of the group consisting of polyvinyl chloride, rigid polyvinyl chloride, ABS and polycarbonate.

* * * * *